United States Patent
Martin

(10) Patent No.: US 8,527,708 B2
(45) Date of Patent: Sep. 3, 2013

(54) DETECTING ADDRESS CONFLICTS IN A CACHE MEMORY SYSTEM

(75) Inventor: Andrew K. Martin, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 318 days.

(21) Appl. No.: 12/984,923

(22) Filed: Jan. 5, 2011

(65) Prior Publication Data
US 2012/0173818 A1    Jul. 5, 2012

(51) Int. Cl.
*G06F 12/00*    (2006.01)

(52) U.S. Cl.
USPC .................... 711/128; 711/118; 711/E12.017

(58) Field of Classification Search
USPC .................................. 711/118, E12.017, 128
See application file for complete search history.

(56) References Cited

U.S. PATENT DOCUMENTS

| | | | |
|---|---|---|---|
| 6,832,268 B2 | 12/2004 | Tan et al. | |
| 2008/0126707 A1 | 5/2008 | Sistla | |
| 2009/0063774 A1 | 3/2009 | Chan et al. | |
| 2012/0066474 A1* | 3/2012 | Funk | 711/207 |

* cited by examiner

*Primary Examiner* — Mardochee Chery
(74) *Attorney, Agent, or Firm* — Yudell Isidore Ng Russell PLLC

(57) ABSTRACT

A cache memory providing improved address conflict detection by reference to a set associative array includes a data array that stores memory blocks, a directory of contents of the data array, and a cache controller that controls access to the data array. The cache controller includes an address conflict detection system having a set-associative array configured to store at least tags of memory addresses of in-flight memory access transactions. The address conflict detection system accesses the set-associative array to detect if a target address of an incoming memory access transaction conflicts with that of an in-flight memory access transaction and determines whether to allow the incoming transaction memory access transaction to proceed based upon the detection.

12 Claims, 5 Drawing Sheets

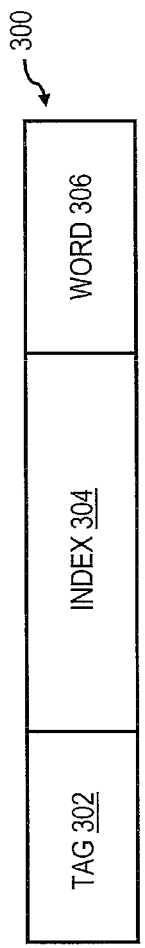
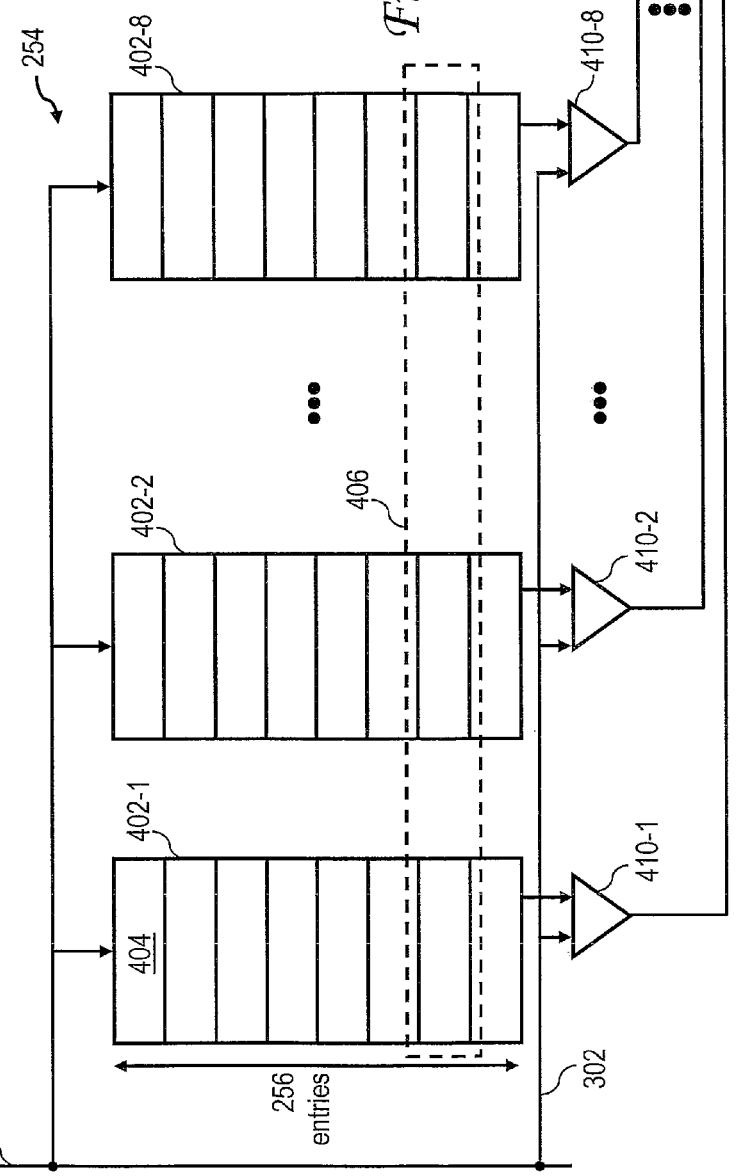

DETECTING ADDRESS CONFLICTS IN A CACHE MEMORY SYSTEM

BACKGROUND OF THE INVENTION

1. Technical Field

The present invention relates to data processing and, in particular, to a data processing system having an improved shared cache system.

2. Description of the Related Art

Computer systems generally include one or more processors and system memory, which may be implemented, for example, with Dynamic Random Access Memory (DRAM). Because of the disparate operating frequencies of the processor(s) and DRAM, computer systems commonly implement between the processor(s) and system memory one or more levels of high speed cache memory, which may be implemented, for example, in Static Random Access Memory (SRAM). The cache memory holds copies of instructions or data previously fetched from system memory at significantly lower access latency than the system memory. Consequently, when a processor needs to access data or instructions, the processor first checks to see if the data or instructions are present in the cache memory. If so, the processor accesses the data or instructions from the cache rather than system memory, thus accelerating throughput.

Modern cache memories can serve multiple processor cores or hardware threads of execution and may have to handle many access requests at a given time. To ensure proper operation, the access requests cannot be permitted to interfere with one another by, for example, requesting the same memory address and, hence, the same cache entry. To prevent this, prior cache systems have compared incoming request addresses with those of in-flight requests being processed. In particular, each in-flight request is assigned a dedicated bank of latches, and each incoming request address is compared against each in-flight address held in the latches.

Next-generation shared caches will be required to process hundreds or even thousands of concurrently executing transactions. Current cache designs, however, cannot scale to such large numbers of concurrent requests. That is, extension of current practice to handle such large numbers of concurrent requests requires too many latches and comparators and too much die space to be practical for high-throughput shared memory systems.

SUMMARY OF THE INVENTION

In at least one embodiment, a cache memory includes a data array that stores memory blocks, a directory of contents of the data array, and a cache controller that controls access to the data array. The cache controller includes an address conflict detection system having a set-associative array configured to store at least tags of memory addresses of in-flight memory access transactions. The address conflict detection system accesses the set-associative array to detect if a target address of an incoming memory access transaction conflicts with that of an in-flight memory access transaction and determines whether to allow the incoming transaction memory access transaction to proceed based upon the detection.

BRIEF DESCRIPTION OF THE DRAWINGS

The present invention may be better understood by referencing the accompanying drawings. The use of the same reference symbols in different drawings indicates similar or identical items.

FIG. 3 depicts an exemplary system memory address in accordance with one embodiment.

FIG. 4 is a diagram illustrating an exemplary set-associative in-flight address array in accordance with embodiments of the present invention.

DETAILED DESCRIPTION OF ILLUSTRATIVE EMBODIMENT

Figure 1:
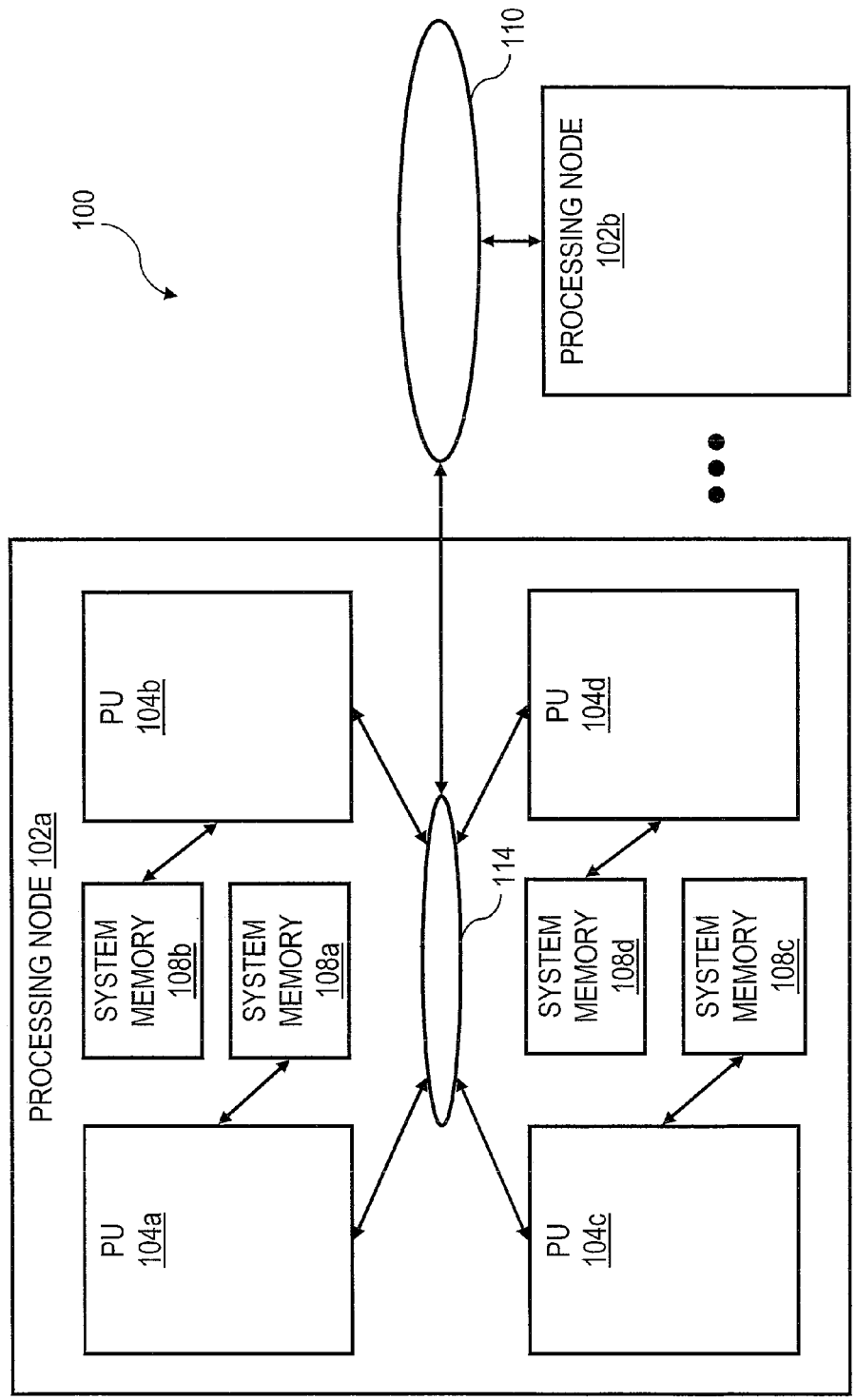
FIG. 1 is a high-level block diagram illustrating an exemplary multiprocessor data processing system according to embodiments of the present invention.

Turning now to the drawings and with particular attention to FIG. 1, a block diagram of an exemplary data processing system 100 according to embodiments of the present invention is shown. As shown, data processing system 100 includes multiple processing nodes 102a, 102b for processing data and instructions. Processing nodes 102a, 102b are coupled to a system interconnect 110 for conveying address, data and control information. System interconnect 110 may be implemented, for example, as a bused interconnect, a switched interconnect or a hybrid interconnect.

In the depicted embodiment, each processing node 102 is realized as a multi-chip module (MCM) containing four processing units 104a-104d; each may be realized as a respective integrated circuit. The processing units 104a-104d within each processing node 102 are coupled for communication by a local interconnect 114, which, like system interconnect 110, may be implemented with one or more buses and/or switches.

The devices coupled to each local interconnect 114 include not only processing units 104, but also one or more system memories 108a-108d. Data and instructions residing in system memories 108 can generally be accessed and modified by a processor core 200 (FIG. 2) in any processing unit 104 in any processing node 102 of data processing system 100. In alternative embodiments of the invention, one or more system memories 108 can be coupled to system interconnect 110 rather than a local interconnect 114.

Those skilled in the art will appreciate that data processing system 100 can include many additional unillustrated components, such as interconnect bridges, non-volatile storage, ports for connection to networks or attached devices, etc. Because such additional components are not necessary for an understanding of the present invention, they are not illustrated in FIG. 1 or discussed further herein. It should also be understood, however, that the enhancements provided by the present invention are applicable to data processing systems of diverse architectures and are in no way limited to the generalized data processing system architecture illustrated in FIG. 1.

Figure 2:
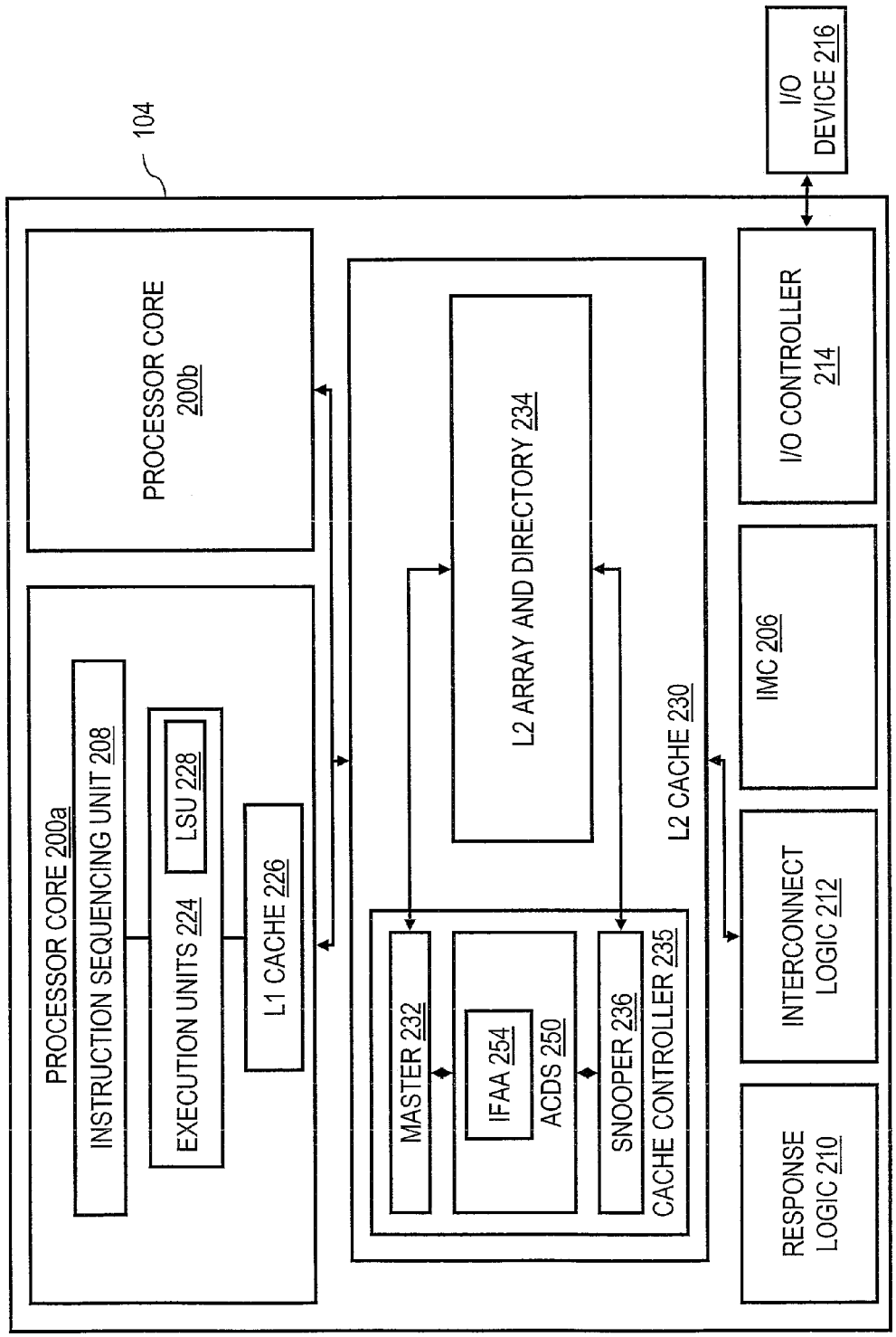
FIG. 2 is a block diagram illustrating an exemplary processor in accordance with embodiments of the present invention.

Referring now to FIG. 2, there is depicted a more detailed block diagram of an exemplary processing unit 104 in accordance with embodiments of the present invention. As shown, each processing unit 104 includes two processor cores 200a, 200b for independently processing instructions and data. Each processor core 200 includes at least an instruction sequencing unit (ISU) 208 for fetching and ordering instructions for execution and one or more execution units 224 for executing instructions. The instructions executed by execution units 224 include instructions that request access to a memory block or cause the generation of a request for access to a memory block, and execution units 224 include a load-store unit (LSU) 228 that executes memory access instructions (e.g., storage-modifying and non-storage-modifying instructions).

Processing unit 104 also includes an instance of forwarding logic 212 for selectively forwarding communications between its local interconnect 114 and system interconnect 110 (FIG. 1). Additionally, processing unit 104 includes an integrated I/O (input/output) controller 214 supporting the attachment of one or more I/O devices, such as I/O device 216.

The operation of processor cores 200 is supported by a multi-level volatile memory hierarchy having at its lowest level shared system memories 108a-108d, and at its upper levels one or more levels of cache memory. In the depicted embodiment, each processing unit 104 includes an integrated memory controller (IMC) 206 that controls read and write access to a respective one of the system memories 108a-108d within its processing node 202 in response to requests received from processor cores 200a-200b and operations snooped on the local interconnect 214.

In the illustrative embodiment, the cache memory hierarchy of processing unit 104 includes a store-through level one (L1) cache 226 within each processor core 200 and a level two (L2) cache 230 shared by all processor cores 200a, 200b of the processing unit 104. L2 cache 230 includes an L2 array and directory 234, as well as a cache controller 235 including a master 232 and a snooper 236. Master 232 initiates transactions on local interconnect 214 and system interconnect 210 and accesses L2 array and directory 234 in response to memory access (and other) requests received from the associated processor cores 200a-200b. Snooper 236 snoops operations on local interconnect 114, provides appropriate responses, and performs any accesses to L2 array and directory 234 required by the operations.

In the embodiment illustrated, the L2 cache 230 includes or is coupled to an address conflict detection system (ACDS) 250, including an in-flight address array (IFAA) 254 for storing addresses of active memory access transactions. Address conflict detection system 250 implements a method of detecting address conflicts in accordance with embodiments of the present invention. In particular, as discussed in greater detail below, in-flight address array 254 stores system memory addresses in use by in-flight memory access transactions and compares system addresses of in-flight memory access transactions with system addresses of newly-arrived memory access transactions received, for example, from master 232 or snooper 236. If an address conflict is detected between a newly arrived memory access transaction and an in-flight memory access transaction, address conflict detection system 250 may implement or cause to be implemented, a conflict resolution process.

In some embodiments, in-flight address array 254 is implemented as a set-associative array. As is known, an n-way set-associative array contains m sets of storage locations corresponding to m groups of system memory addresses, with each of the m sets containing n entries. A system memory address is mapped to a specific one of the m sets by an index portion of the system memory address, and a tag portion of the system memory addresses can then be stored in any of the n entries ("ways") of the set. For example, FIG. 3 depicts an exemplary system memory (i.e., real) address 300. System memory address 300 includes an address tag field 302 formed of the higher order bits, an index field 304 formed of the middle order bits, and a word field 306 formed of the low order bits. Index field 304, which includes $\log_2$ m bits, is utilized to select one set of the m sets, and tag field 302 can then be stored in or compared to the contents of the n entries of the selected one of the m sets.

Although the illustrated cache hierarchy includes only two levels of cache, those skilled in the art will appreciate that alternative embodiments may include additional levels (L3, L4, etc.) of on-chip or off-chip in-line or lookaside cache, which may be fully inclusive, partially inclusive, or non-inclusive of the contents the upper levels of cache. It should be understood that in other embodiments, address conflict detection system 250 can be implemented at a different level of cache memory than the L2 cache. It is preferred, however, that address conflict detection system 250 is implemented at the level in the cache hierarchy at which system-level coherence is determined.

With reference now to FIG. 4, there is illustrated an exemplary set-associative in-flight address array 254, in accordance with embodiments of the present invention. In the illustrated example, in-flight address array 254 includes 8 ways 402, with each of ways 402-1, 402-2, ..., 402-8 having 256 entries 404 for storing the address tags of system memory addresses of in-flight transactions. Each set 406 of eight entries 404, one from each of ways 402-1 through 402-8, is associated with a respective one of the plurality of possible values of the index field 304 of a target memory address.

An address line 408 provides a target system memory address corresponding to a new, incoming memory access transaction to a bank of comparators 410, which includes a respective comparator 410-1, 410-2, ..., 410-8 for each way 402. The output of comparators 410 is provided to address conflict detection system 250 either in decoded form or logically combined, for example, by optional OR gate 412.

In operation, in response to a system memory address of an incoming memory access transaction appearing on the address line 408, a set 406 of entries 404 is selected and read out from ways 402 by the index field 304 of the system memory address of the incoming memory access transaction. Comparators 410 then compare the contents of the tag field 302 of the system memory address of the incoming memory access transaction to those within the entries 404 comprising the selected set 406. The outputs of comparators 410 are then provided to address conflict detection system 250, either directly or via OR gate 412. If comparator 410 indicate a conflict of the system memory address of the incoming memory access transaction with an in-flight memory access transaction, then address conflict detection system 250 can handle the detected address conflict, for example, by causing the incoming memory access transaction to be retried, halted or paused.

Although FIG. 4 depicts an exemplary embodiment in which in-flight address array 254 is implemented as a set-associative array including 8 ways 402 each having 256 entries 404, it should be appreciated that in other embodiments differing numbers of ways and entries can be employed.

Figure 5:
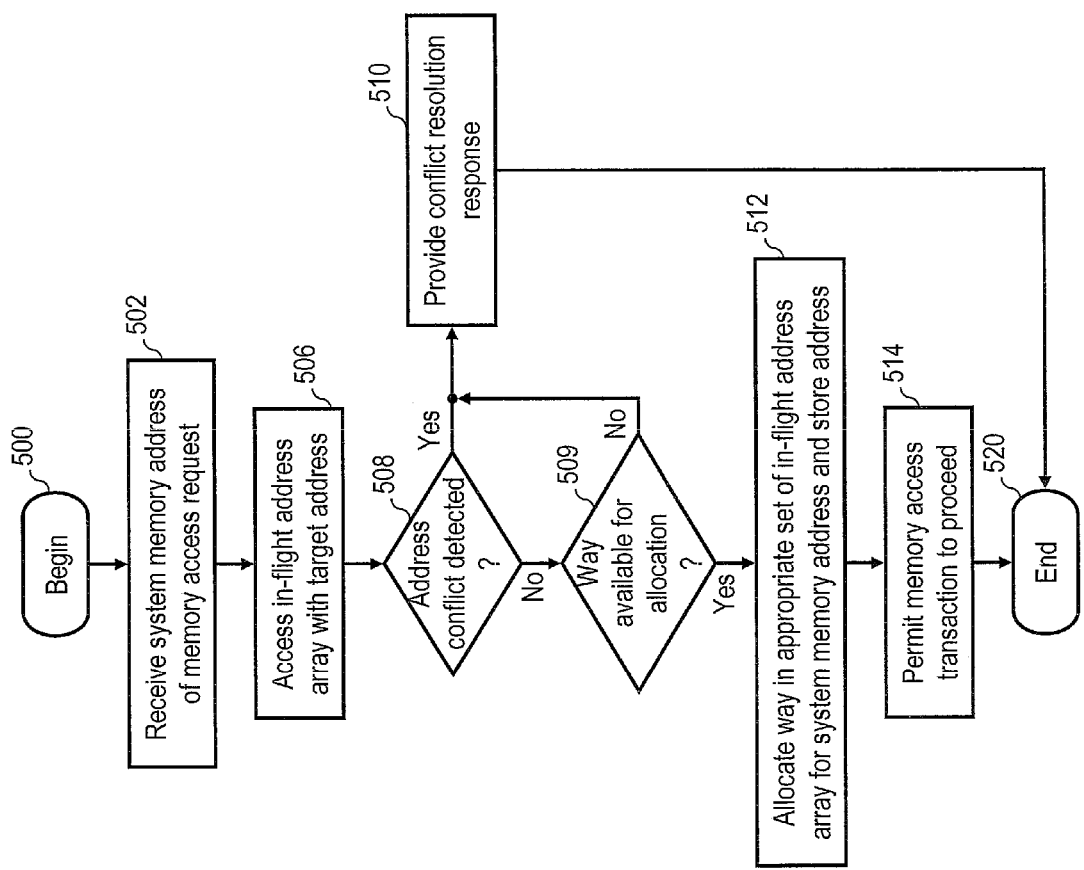
FIG. 5 is a high level logical flowchart illustrating detection of an address conflict in accordance with one embodiment.

Referring now to FIG. 5, there is depicted a high level logical flowchart of the operation of address conflict detection system in accordance with at least one embodiment. The particular arrangement of steps in FIG. 5 is not meant to imply a fixed order to the elements; embodiments can be practiced in any order that is practicable.

The process begins at block 500 and then proceeds to block 502, which depicts address conflict detection system 250 and, in particular, in-flight address array 254 receiving a system memory address specified by a memory access transactions received by master 232 from a processor core 200 or received by snooper 234 from an interconnect 110, 114.

In response to receipt of the system memory address, address conflict detection system 250 accesses in-flight address array 254, which, as discussed above, may be implemented as a set-associative array (block 506). In such embodiments, index field 304 of the system memory address indexes into a particular set 406 and then comparators 410 compare the tag field 302 of the system memory address with those stored in the entries 404 of the selected set 406 to determine whether or not the system memory address conflicts with an in-flight memory access transaction (block 508). It should be noted that, given the set-associative structure of in-flight address array 254, only a small subset of addresses of in-flight memory access transactions are compared to detect an address conflict.

If in-flight address array 254 signals an address conflict, then address conflict detection system 250 preferably provides a conflict resolution response (block 510). Depending upon implementation-dependent consideration such as the implemented coherence protocol, required system transaction timings, and the number of available instances of transaction handling logic within master 232 and snooper 236, the conflict resolution response may include, for example, (1) providing a retry response forcing the source of the memory access transaction to retry the memory access transaction at a later time, (2) halting the transaction without providing a response, or (3) delaying performance of the requested memory access until the conflicting in-flight memory access transaction completes. Thereafter, the process depicted in FIG. 5 ends at block 520.

Returning to block 508, if in-flight address array 254 does not signal detection of an address conflict, address conflict detection system 250 determines whether or not an entry 404 in the set 406 of in-flight address array 254 selected by the index field 304 of the target address of the incoming memory access transaction is available for allocation (block 509). In general, with an appropriate sizing of in-flight address array 254 relative to the number of in-flight memory access transactions that are supported within data processing system 100, an entry 404 will be available for allocation to the incoming memory access transaction. Accordingly, processing continues at block 512. If, however, the distribution of target address of in-flight memory access transactions renders all entries 404 of the selected set 406 occupied and thus unavailable for allocation, the process passes to block 510, which has been described.

At block 512, address conflict detection system 250 allocates a entry 404 within the set 406 of in-flight address array 254 selected by the index field 304 of the system memory address and stores at least the tag field 302 of the system memory address within the allocated entry. In addition, address conflict detection system 250 permits the memory access transaction to be handled and/or performed in a conventional manner, for example, by permitting master 232 or snooper 236 to access L2 array and directory 234 and provide any required coherence response (block 514). Thereafter, the process of FIG. 5 ends at block 520.

Figure 6:
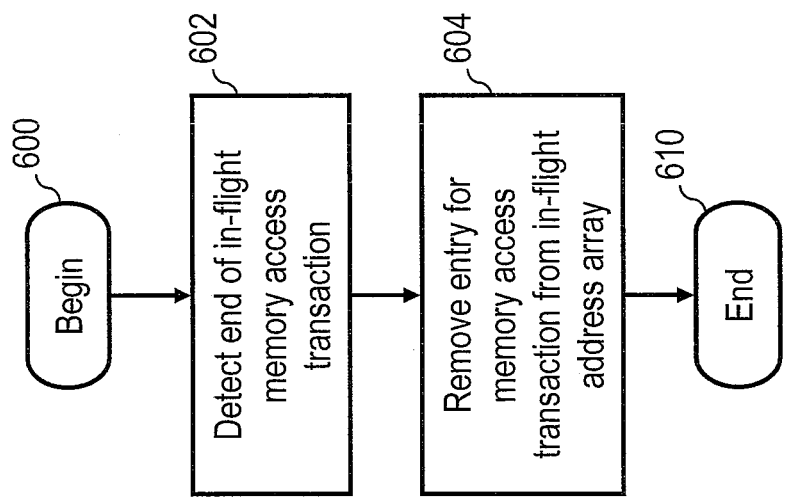
FIG. 6 is a high level logical flowchart depicting removal of an address tag from an entry from in-flight address array in accordance with one embodiment.

Referring now to FIG. 6, there is depicted a high level logical flowchart by which address conflict detection system 250 removes address tags from entries 404 of in-flight address array 254. The particular arrangement of steps in FIG. 6 is not meant to imply a fixed order to the elements; embodiments can be practiced in any order that is practicable.

The process begins at block 600 and then proceeds to block 602, which depicts address conflict detection system 250 detecting end of an in-flight memory access transaction. For example, address conflict detection system 250 may detect end of an in-flight transaction by receiving a notification from master 232 or snooper 236 that it has completed handling of a memory access transaction. In response to detection of the end of an in-flight memory access transaction at block 602, address conflict detection system 250 clears the corresponding entry 404 in in-flight transaction array 254 (block 604). Thereafter, the process ends at bock 610.

As has been described, in at least one embodiment, a cache memory includes a data array that stores memory blocks, a directory of contents of the data array, and a cache controller that controls access to the data array. The cache controller includes an address conflict detection system having a set-associative array configured to store at least tags of memory addresses of in-flight memory access transactions. The address conflict detection system accesses the set-associative array to detect if a target address of an incoming memory access transaction conflicts with that of an in-flight memory access transaction and determines whether to allow the incoming transaction memory access transaction to proceed based upon the detection.

As used herein, whether in the above description or the following claims, the terms "comprising," "including," "having," "containing," "involving" and the like are to be understood to be open-ended, that is, to mean including but not limited to. Only the transitional phrases "consisting of" and "consisting essentially of," respectively, shall be understood and interpreted in an exclusive manner.

Any use of ordinal terms (e.g., "first," "second," "third," etc.) in the claims to modify a claim element does not by itself connote any priority, precedence, or order of one claim element over another, or the temporal order in which acts of a method are performed. Rather, unless specifically stated otherwise, such ordinal terms are used merely as labels to distinguish one claim element having a certain name from another element having the same name but for use of the ordinal term.

The above described embodiments are intended to illustrate the principles of the invention, but not to limit the scope of the invention. Various other embodiments and modifications to these preferred embodiments may be made by those skilled in the art without departing from the scope of the present invention.

What is claimed is:
1. A cache memory, comprising:
   a data array that stores memory blocks;
   a directory of contents of the data array; and
   a cache controller that controls access to the data array, the cache controller including an address conflict detection system including a set-associative array configured to store at least tags of memory addresses of in-flight memory access transactions, wherein the set-associative array includes a plurality of sets each including multiple ways that store at least tags of memory addresses of in-flight memory access transactions;
   wherein the address conflict detection system accesses the set-associative array to detect if a target address of an incoming memory access transaction conflicts with that of an in-flight memory access transaction and determines whether to allow the incoming memory access transaction to proceed based upon the detection;
   wherein the address conflict detection system allocates a way to the incoming memory access transaction within a set of the set-associative array determined by an index field of the target address if an address conflict is not detected.

2. The cache memory of claim 1, wherein the address conflict detection system prevents an incoming memory access transaction that conflicts with that of an in-flight memory access transaction from proceeding.

3. The cache memory of claim 1, wherein the address conflict detection system prevents the incoming memory transaction from proceeding if all ways within a set determined by an index field of the target address are occupied.

4. The cache memory of claim 1, wherein the address conflict detection system clears the way of the set-associative array in response to the incoming memory access transaction completing processing.

5. A data processing system, comprising:
   a processor core; and
   cache memory coupled to the processor core, the cache memory including
   a data array that stores memory blocks;
   a directory of contents of the data array; and
   a cache controller that controls access to the data array, the cache controller including an address conflict detection system including a set-associative array configured to store at least tags of memory addresses of in-flight memory access transactions, wherein the set-associative array includes a plurality of sets each including multiple ways that store at least tags of memory addresses of in-flight memory access transactions;
   wherein the address conflict detection system accesses the set-associative array to detect if a target address of an incoming memory access transaction conflicts with that of an in-flight memory access transaction and determines whether to allow the incoming transaction memory access transaction to proceed based upon the detection;
   wherein the address conflict detection system allocates a way to the incoming memory access transaction within a set of the set-associative array determined by an index field of the target address if an address conflict is not detected.

6. The data processing system of claim 5, wherein the address conflict detection system prevents an incoming memory access transaction that conflicts with that of an in-flight memory access transaction from proceeding.

7. The data processing system of claim 5, wherein the address conflict detection system prevents the incoming memory transaction from proceeding if all ways within a set determined by an index field of the target address are occupied.

8. The data processing system of claim 5, wherein the address conflict detection system clears the way of the set-associative array in response to the incoming memory access transaction completing processing.

9. A method of data processing system, comprising:
   receiving at least a tag of a target address of an incoming memory access transaction of a cache memory;
   accessing a set-associative array to detect whether the target address of the incoming memory access transaction conflicts with that of an in-flight memory access transaction;
   in response to the detection, permitting the incoming memory access transaction to proceed if no address conflict is detected and preventing the incoming memory access transaction from proceeding if an address conflict is detected; and
   allocating a way to the incoming memory access transaction within a set of the set-associative array determined by an index field of the target address if an address conflict is not detected.

10. The method of claim 9, wherein:
    the set-associative array includes a plurality of sets each including multiple ways; and
    the method further comprises storing at least tags of memory addresses of in-flight memory access transactions in the ways of the set-associative array.

11. The method of claim 10, and further comprising preventing the incoming memory transaction from proceeding if all ways within a set determined by an index field of the target address are occupied.

12. The method of claim 9, and further comprising clearing tags of in-flight memory access transactions from the set-associative array in response to completion of processing of the in-flight memory access transactions.

* * * * *